United States Patent [19]

Shirey et al.

[11] Patent Number: 5,010,224
[45] Date of Patent: Apr. 23, 1991

[54] VERY SMALL ORIFICE MANUFACTURING SYSTEM

[75] Inventors: Roy D. Shirey, Laurens; Michael T. Nelson; Robert J. Laurenzi, both of Taylors, all of S.C.

[73] Assignee: Lucas Industries, plc, United Kingdom

[21] Appl. No.: 365,258

[22] Filed: Jun. 12, 1989

[51] Int. Cl.$^5$ .......................... B23H 9/14; B23H 7/20
[52] U.S. Cl. .................................. 219/69.17; 73/4 R; 73/37.5; 364/474.04; 364/552; 408/2
[58] Field of Search ..................... 408/2; 73/37.5, 37.8, 73/37.9, 38, 119 A, 4 R, 4 D, 4 V; 364/474.01, 474.04, 474.15, 474.16, 474.17, 550, 551.02, 558, 552; 219/69.17

[56] References Cited

U.S. PATENT DOCUMENTS

| | | |
|---|---|---|
| 1,222,289 | 4/1917 | Hewitt . |
| 1,288,363 | 12/1918 | Young . |
| 1,298,471 | 3/1919 | Dodge . |
| 1,311,228 | 7/1919 | Hollenbeck et al. . |
| 2,436,429 | 2/1948 | Hanners . |
| 2,487,083 | 11/1949 | Warshaw . |
| 2,517,766 | 8/1950 | Cole . |
| 2,585,290 | 2/1952 | Walker . |
| 2,726,539 | 12/1955 | Aller . |
| 2,744,407 | 5/1956 | Kruger et al. . |
| 3,448,854 | 6/1969 | Holmer et al. . |
| 3,511,087 | 5/1970 | Emerson et al. . |
| 3,822,592 | 7/1974 | Siegel et al. ........................ 73/211 |
| 3,828,247 | 8/1974 | Kirsch et al. ...................... 324/28 R |
| 3,863,492 | 2/1975 | Trask, II ............................ 73/37.5 |
| 4,041,778 | 8/1977 | Ikinobu ............................. 73/119 A |
| 4,165,635 | 8/1979 | Komaroff et al. ................. 73/119 A |
| 4,393,722 | 7/1983 | Scott ................................ 73/861.61 |
| 4,432,227 | 2/1984 | Dunn . |
| 4,432,228 | 2/1984 | Kuschmierz et al. . |
| 4,520,655 | 6/1985 | Owens .................................. 73/46 |
| 4,523,458 | 6/1985 | Daniel .............................. 73/119 A |
| 4,559,815 | 12/1985 | Needham ......................... 73/119 A |
| 4,712,421 | 12/1987 | Young .............................. 73/119 A |
| 4,725,705 | 2/1988 | Holland-Moritz et al. ..... 364/474.04 |
| 4,753,555 | 6/1988 | Thompson et al. .................... 408/2 |
| 4,788,858 | 12/1988 | Liebermann ..................... 73/119 A |
| 4,858,466 | 8/1989 | Takahashi et al. ................ 73/119 A |
| 4,907,167 | 3/1990 | Skeirik .............................. 364/550 |

FOREIGN PATENT DOCUMENTS 2198236 6/1988 United Kingdom .

OTHER PUBLICATIONS

Ishikawa, "Guide to Quality Control", Unipub Kraus International Publications, White Plains, New York, 12/1982, chapters 7-8, pp. 61-85.
Juran et al, "Quality Planning and Analysis", 2nd Edition, McGraw-Hill, Inc., 12/1980, sections 14-4-14-6, pp. 336-343.
Maynard, "Industrial Engineering Handbook", 3rd Edition, McGraw-Hill, Inc., 12/1971, pp. 8-134-8-136.

Primary Examiner—Geoffrey S. Evans
Attorney, Agent, or Firm—Dority & Manning

[57] ABSTRACT

An improved manufacturing method produces small orifices in a succession of work pieces according to a desired flow specification. After the work pieces are subjected to one or more preliminary processing steps, an apparatus, preferably an electro discharge machine, is used to produce a small orifice in each work piece. A gas, preferably nitrogen, is flowed through the orifice produced in a work piece, and the pressure drop of the gas flowing through the orifice is measured, preferably by a pressure gauge capable of providing both a visual display for a human operator and an electrical signal for a microprocessor. The pressure drop is compared to a correlation of pressure drop and the desired flow specification. The results of the comparison are used to determine whether an adjustment is needed to the apparatus and/or one of the preliminary processing steps. The comparison can involve the use of a distribution curve, and an adjustment can be made when the comparison result falls within what appears to be a new distribution curve. A statistical process control plan such as the Shainin Precontrol Method or the Shewhart X,R Chart Method can be used to reduce the frequency of performing the step of flowing the gas through the orifice. The adjustments can be made automatically by using a microprocessor to make the comparison and to initiate the adjustments in the apparatus that produces the small orifice.

21 Claims, 4 Drawing Sheets

VERY SMALL ORIFICE MANUFACTURING SYSTEM

BACKGROUND OF THE INVENTION

The present invention relates to a system for manufacturing a very small flow orifice in which the shape, size, and surface finish of the orifice significantly affect the character of the flow through the orifice. In one particular embodiment, the invention permits a very high degree of control over manufacture of an orifice of a fuel injector so that the injector exhibits repeatable flow characteristics.

An electro discharge machine (EDM) can be used to produce very small flow orifices, i.e., on the order of less than one millimeter in diameter. The operating parameters of the EDM affect the character of the orifices so produced. Some of these parameters are controlled by the operator. For example, changes to the feed rate of the spark erosion electrode and the peak current intensity supplied to the electrode, or changes to the size in the electrode diameter, each affect the orifice produced by the EDM. Other factors include on and off times, servo and power settings.

In addition, there are a number of factors which are not controlled by the operator yet nonetheless affect the flow characteristics of the small orifice produced by an electro discharge machine. Some of the more significant factors relate to the EDM. For example, the electrode burns away during use and often begins to taper and/or get out of round as it burns away. Variation also occurs in electrode diameter, both between electrodes of different nominal sizes and between electrodes of the same nominal size. The electrode also can be damaged by contamination. Moreover, the processing of the parts presented to the EDM can vary. For example, parts from different processing batches (such as a turning or a stamping process) can be presented with thickness variations, or the heat treatment layer thicknesses of parts can vary among parts within the same processing batch.

As noted above, fuel injectors have one or more flow orifices, which are examples of a kind of small orifice.

Several methods are known for testing different aspects of fuel injectors. Air or nitrogen has been applied to the fully assembled injector at a known pressure so that a gauge can be used to detect any reduction in that pressure due to leaks. Air has also been used to check the flow characteristics of a fully assembled fuel injector or just an exiting orifice plate of a fuel injector. However, this air flow test method has proven inaccurate due to the low level of repeatability resulting from moisture and contaminants in the air as well as variations experienced due to the temperature of the supplied air. Moreover, moisture in the test air can cause corrosion of a flow orifice, and contaminants in the test air also can damage an orifice and change its flow characteristics.

In addition, the flow characteristics of a fuel injector or just an orifice plate can be tested using the method of flowing a liquid known as Stoddard solvent through a fully assembled injector or an orifice plate assembled in a mock injector assembly and measuring whether the flow rate is acceptable. In a mock assembly, the orifice plate is clamped into the injector. In a true assembly, the orifice plate is welded into the injector.

As known in the art, Stoddard solvent mimics the flow rate characteristics of gasoline. Stoddard solvent is not as flammable as gasoline and thus is more suitable for tests conducted in a manufacturing environment.

Stoddard testing or air testing a completed injector has its drawbacks. In both cases, the injector is in an assembled state before flow testing can be conducted. Time delays resulting from the time needed to complete the testing can result in the fabrication of a large number of failed injectors before the condition of an improper orifice can be detected in a finished product. Stoddard testing an orifice plate in particular requires sophisticated flow equipment, is very time consuming, and the test results correlate poorly to the finished products.

In order to produce a fuel injector orifice plate with an orifice sized according to a desired flow specification, the EDM operator selects set up conditions (i.e., electrode diameter size, guide size, etc.), and an initial operating condition for the EDM based upon prior experience in producing that particular orifice. The orifice is made with the EDM set at the selected operating conditions. To provide information feedback for controlling the orifice manufacturing process, the orifice plate would be subjected to a Stoddard test in a mock injector assembly. This test requires about ten minutes or so to perform. Moreover, a very sophisticated and expensive piece of equipment is required to perform the Stoddard test, and this equipment occupies a significant amount of space on the factory floor. Depending upon the result of this Stoddard test, the operator again adjusts the EDM operating parameters according to the judgment and experience of the operator. A new orifice is fabricated and subjected to the Stoddard test.

This continues until several orifice plates with flow that is deemed acceptable are obtained in succession. Then production begins.

Since it is prohibitively uneconomical to provide a single Stoddard machine for each EDM, the availability of the Stoddard machine determines how many orifice plates are tested. Normally, only about 10% of the orifice plates are tested. Depending upon the number of EDM's being serviced by a particular Stoddard test machine, thirty or forty minutes may elapse between testing of an orifice produced by a particular EDM. If the tested orifice proves faulty, then a substantial number of defective orifice plates would have been produced by that EDM. Moreover, because of the long time needed to perform the present test method, the number of manufactured parts being tested (the test sample) is very small relative to the total number being manufactured. This fact prevents the operator from obtaining an accurate indication of where in the realm of the flow specification, the parts being made are distributed. This results from the lack of statistical confidence in low sample sizes. Thus, correcting for the degree to which the orifice is unacceptable is largely a matter of the individual operator's judgment based on experience. Often, the operator changes the operating parameters of the EDM more than is required.

Figure 1:
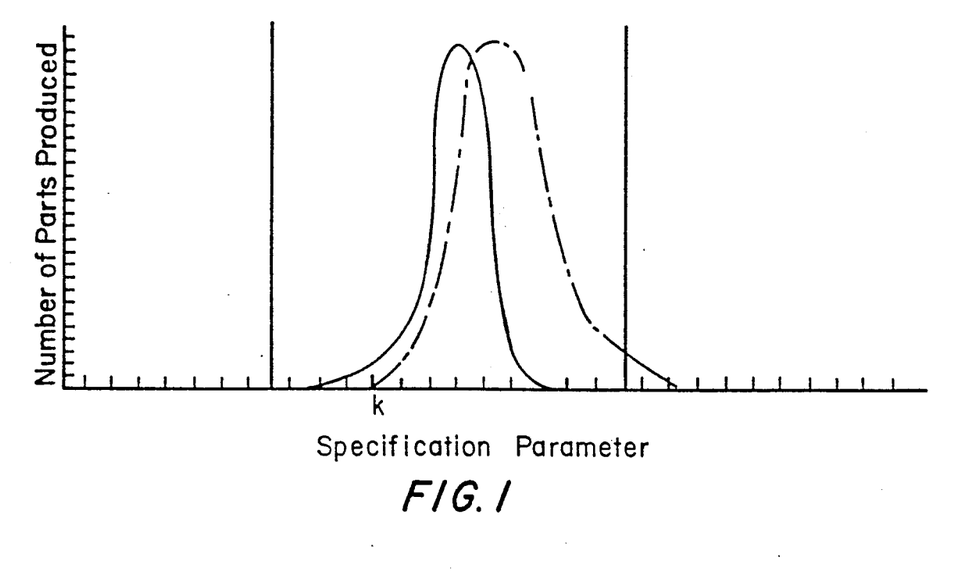
FIG. 1 is a graph that illustrates a problem in prior systems.
Figure 2:
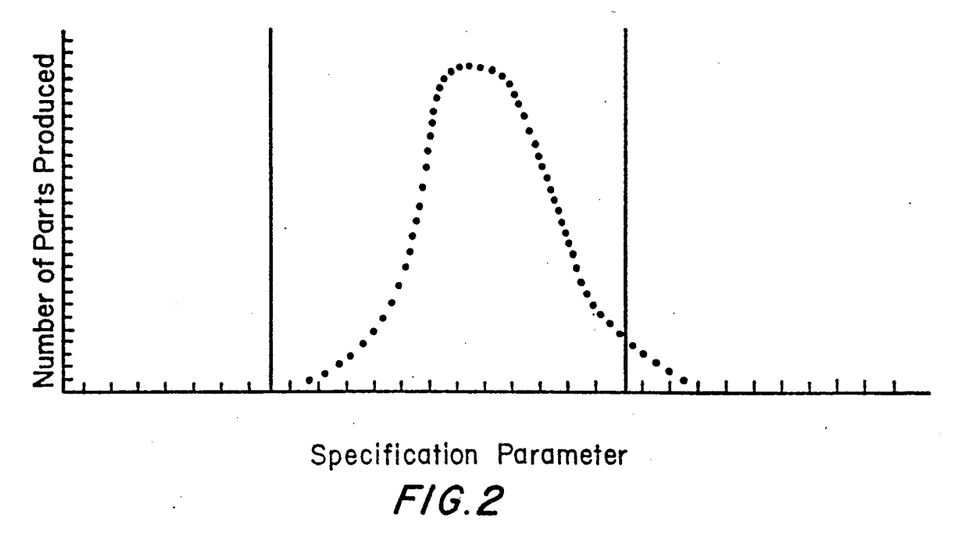
FIG. 2 is a graph that further illustrates prior systems.

In FIG. 1, the solid line curve shows a possible distribution of parts relative to the part specification illustrated by the two vertical lines. The value "k" in FIG. 1 represents a specification parameter (e.g., a Stoddard flow value) near the lower limit. Because of the small number of parts that can be tested, the operator is ignorant of the shape or relative location of the distribution curve shown in FIG. 1. Thus, even though the operator knows the coordinates for the part, the operator does not know where the distribution curve falls relative to this part's coordinates. Thus, when the EDM operator tests a part at value "k" of the specification parameter, the operator may decide to adjust the EDM operating conditions to produce parts nearer to the higher specification parameter limit. This adjustment could, depending upon the actual position of the distribution relative to the tested part, produce a frequency distribution of additional parts like the dashed line. As shown in FIG. 2, which combines the curves of FIG. 1, this unneeded adjustment results in a wider overall distribution of orifice flow rates being produced and more parts produced near the opposite limit of the parts specification. Accordingly, more unacceptable orifices are produced.

It also is known to combine several tests, such as Stoddard tests and air tests in sequence in an attempt to cull the unacceptable parts and eliminate testing errors. However, 100% testing to obtain zero defects of parts produced is not economical because of the costs of the increased time devoted to testing and the greater number of test equipment units which must be employed.

OBJECTS AND SUMMARY OF THE INVENTION

It is a principal object of the present invention to provide a system for manufacturing a very small orifice with a high degree of repeatability in the characteristics between the orifices so produced.

It is a further principal object of the present invention to provide a manufacturing system for producing a very small flow orifice wherein any deviation from a narrowly defined range of flow characteristics between the orifices so produced is quickly detected and remedied.

It is also a principal object of the present invention to provide a manufacturing system for producing a very small flow orifice wherein any deviation from a narrowly defined range of flow characteristics for the orifices so produced is automatically detected and remedied.

Yet another principal object of the present invention is to provide a manufacturing system for producing a very small flow orifice such that the distribution of the orifices so produced by the system is very tightly grouped within the flow specification.

It is another principal object of the present invention to provide a system for manufacturing a very small flow orifice of a fuel injector with a high degree of repeatability in the flow characteristics between the orifices so produced.

It is still a further principal object of the present invention to provide a manufacturing system for producing a very small flow orifice of a fuel injector wherein any deviation from a narrowly defined range of flow characteristics between the orifices so produced is quickly detected and remedied.

It is also a principal object of the present invention to provide a manufacturing system for producing a very small flow orifice of a fuel injector wherein any deviation from a narrowly defined range of flow characteristics for the orifices so produced is automatically detected and remedied.

Yet another principal object of the present invention is to provide a manufacturing system for producing a very small flow orifice for a fuel injector such that the distribution of the orifices so produced by the system is very tightly grouped within the flow specification.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a manufacturing method for producing at least one very small orifice in each of a succession of work pieces according to a desired flow specification includes the step of using an apparatus to produce a very small orifice in each work piece taken from the succession of work pieces. This preferably is accomplished using a device for fabricating a very small hole. Two examples of a suitable device include an electro discharge machine and a drill.

The method of the present invention further includes the step of selecting a first work piece from the succession of work pieces according to a predetermined schedule of selection. (The use of the term first is intended to enable the reader to distinguish from a work piece that comes before another in the succession of work pieces and does not mean, necessarily, the very first work piece ever produced in the manufacturing method.) This preferably is accomplished either by selecting every work piece (a 100% testing embodiment, which is an example of a quality control sampling plan) or by utilizing a statistical process control plan to determine the schedule of selection. Thus, a quality control sampling plan and a statistical process control plan are two examples of a predetermined schedule of selection. Two examples of suitable statistical process control plans include the Shainin Precontrol Method and the Shewhart X,R Chart Method. However, different selection schedules can be used to suit the particular manufacturing method or quality control requirement.

The method of the present invention further preferably includes the step of flowing a gas through the orifice of the selected first work piece. This preferably is accomplished using nitrogen as the gas. Preferably, the work piece is mounted on a fixture that positions the work piece so that the gas can flow through the work piece. Preferably, the direction of the gas flow through the orifice of the work piece is selected so as to be the same for each work piece. This preferably is the direction through which the flow will pass when the work piece is used for its intended purpose. However, the direction also can relate to the manner of manufacturing the work piece. For example, the gas can flow from the entry side of the drill into the work piece to the exit side of the drill out of the work piece.

The method of the present invention further preferably includes measuring the pressure drop of the gas flowing through the orifice of the first selected work piece. The pressure drop preferably is measured by connecting a source of pressurized gas to the orifice of the work piece through a pressure gauge, which preferably provides both a visual gauge reading and an electric signal corresponding to the measured pressure. The work pieces can be automatically provided, as by mechanized means, to the fixture which connects the orifice to the pressure measurement device and the gas pressure source. The step of measuring the pressure drop can be automated. In an automated embodiment, the pressure drop measurement device, such as a gauge, can supply an electric signal indicative of the measured pressure.

The method of the present invention further preferably includes the step of comparing the pressure drop to a correlation of pressure drop and flow through orifices of the desired flow specification. This step requires the preliminary steps of producing the correlation of pressure drop and flow and calibrating the nitrogen pressure drop measurement device to be used in connection with the correlation so produced. This step can be performed by a preprogrammed electronic microprocessor.

The method of the present invention further preferably includes the step of using the results of the comparison of the pressure drop with the correlation of pressure drop and flow. The results are used preferably to help determine whether an adjustment is needed to the orifice fabrication apparatus. This preferably is accomplished by using the result as data to generate a first frequency distribution. Then, depending upon the result of the comparison, an adjustment can be made when the result of the comparison falls outside of the first distribution. By the same token, no adjustment is made when the result of the comparison falls within the first distribution. Moreover, an adjustment can be made when the comparison result indicates that the first distribution has changed to a second distribution. In the event of a change to a second distribution, the adjustment can be made so as to move the comparison result of the next work piece in the succession of work pieces, toward the center of either the first distribution or the second distribution, as desired. In addition, the adjustment can be made to the apparatus before the next work piece is presented to the apparatus, or at least before more than a few work pieces have been presented to the apparatus. Furthermore, the step of using the results of the comparison can be performed by an electronic microprocessor which receives signals indicative of the pressure drop obtained during the step of measuring the pressure drop.

In further accordance with the present invention, the method can include the step of subjecting a plurality of work pieces in the succession of work pieces to at least one, and possibly more than one, preliminary processing step before producing a very small orifice in the first selected work piece. These other processing steps can include one or more of the processes known as heat treatment, polishing, lapping, coating, stamping, turning, and coating. Moreover, the results of the comparison can be used to help determine whether an adjustment is needed to one of the preliminary processing steps in addition to whether an adjustment is needed to the apparatus or device that produces the orifice. For example, when the comparison indicates a large or sudden change in the pressure drop readings, it may indicate that the cause is elsewhere than the hole fabrication device and prompt an investigation of the other processing steps.

The method of the present invention further preferably includes the step of making an adjustment in the orifice fabrication apparatus before it produces a very small orifice in a work piece following the first selected work piece in the succession of work pieces. Preferably, the step of making the adjustment in the apparatus is performed by an electronic control unit which can include at least one microprocessor unit which receives at least one of the types of information, such as operating parameters of the apparatus, pressure drop readings, and input information supplied by a human operator or another machine control parameter. The microprocessor unit then controls the orifice fabrication apparatus according to at least one of these types of information. Moreover, when the adjustment is made to an apparatus or a processing step other than the orifice fabrication device, the microprocessor would receive information including operating parameters of such other processing step(s) or processing device(s), and control the other processing step(s) or device(s) according to one or more of the above-mentioned types of information.

In still further accordance with the present invention, the method includes the step of using a statistical process control plan to track the manufacturing method and monitor when the adjustment needs to be made. Suitable statistical process control plans include the Shainin Precontrol Method and the Shewhart $\bar{X},R$ Chart Method.

In yet further accordance with the present invention, the method preferably includes the step of using a statistical process control plan, for example one of those described above, to reduce the frequency of performing the step of flowing gas through the selected orifice. Thus, fewer orifices would need to be subjected to the nitrogen pressure test of the present invention.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Figure 5:
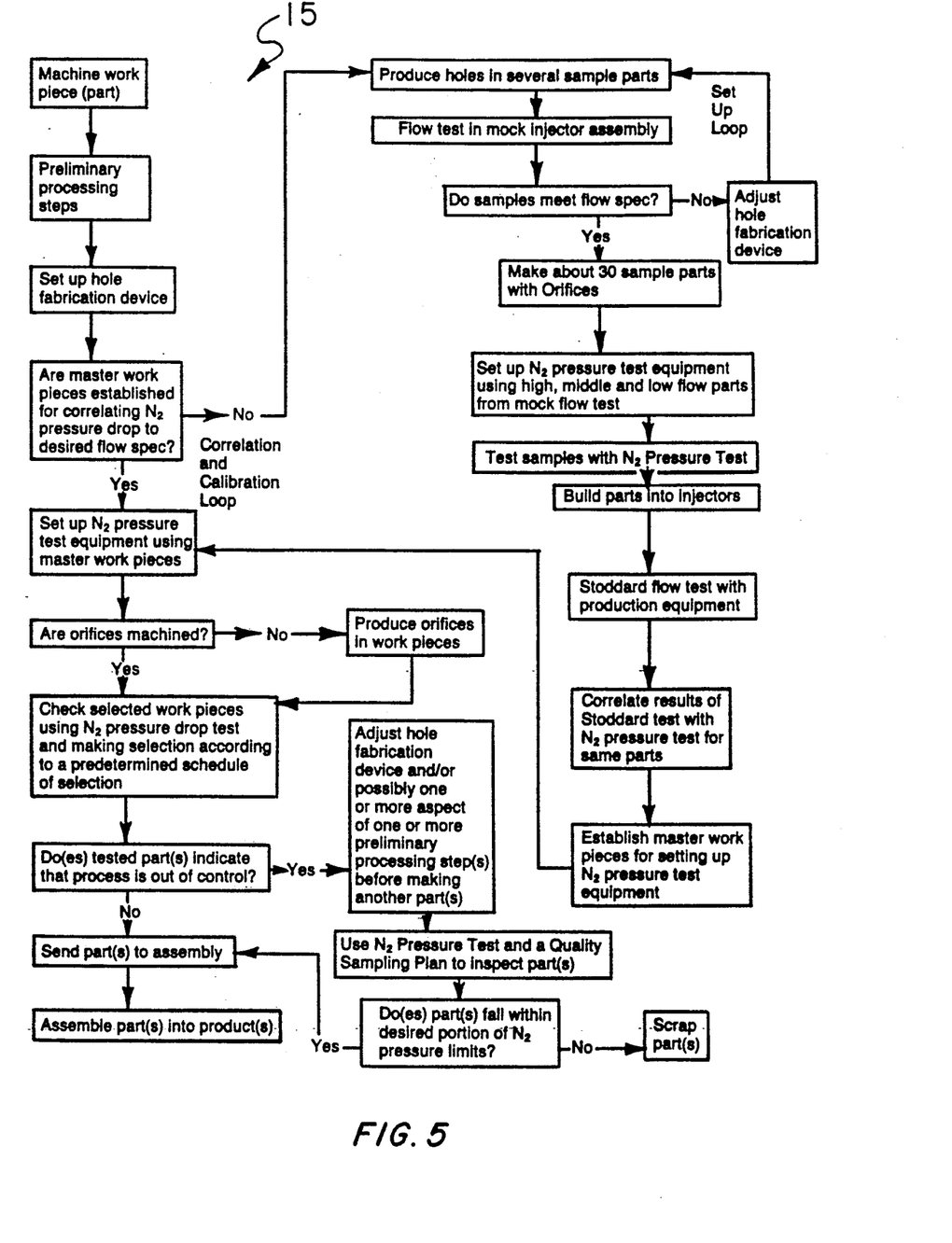
FIG. 5 illustrates schematic of steps in embodiments of the present invention.

Reference now will be made in detail to the present preferred embodiments of the present invention, examples of which are illustrated in the accompanying drawings. As shown in FIG. 5 for example, the invention is illustrated in connection with the production of a small flow orifice for a fuel injector. However, the invention is equally applicable to the system of manufacturing very small orifices for other applications, such as miniaturized mechanical devices, and is not limited to fuel injector flow orifices.

An example of a preferred embodiment of the small orifice manufacturing system is shown in flow chart form in FIG. 5 and is represented generally by the numeral 15.

In accordance with the manufacturing method of the present invention for producing at least one very small orifice in each of a succession of work pieces according to a desired flow specification, the method includes the step of using an apparatus to produce a very small orifice in each work piece taken from the succession of work pieces. In accordance with one preferred embodiment of the present invention, an electro discharge machine (EDM), such as the Bretco EDM sold by Bretco EDM, Inc., of Chesaning, Michigan, is used to produce one or more orifices in a work piece according to a desired specification. However, a drilling machine also can be used as desired. As shown schematically in FIG. 3 for example, an apparatus 16 such as an electro discharge machine or a drilling machine can be used to produce one or more orifices in a work piece according to a specification. A number of work pieces are so produced. The flow rate of each work piece is measured by a fluid flow test. If the flow rate is unsatisfactory, the EDM or drill is adjusted in a manner calculated to improve the flow rate. Another set of orifices are produced in another set of work pieces. Once again, the work pieces are subjected to the fluid flow test to determine whether the flow rate is satisfactory. The flow rate of each work piece is noted and adjustments to the EDM or drill are made accordingly. For example, adjustments to the drill can include changing the drill bit, changing the nominal size of the drill bit, changing the rotational speed of the drill bit, changing the feed rate of the drill bit, etc.

Each work piece from a group which has been subjected to a fluid flow test is mounted on a fixture, i.e., a jig. A gas at a predetermined pressure is applied to the orifice of the work piece preferably in the same manner as the fluid would flow through the orifice in its intended use. The primary requirement is to measure the pressure drop from the same flow direction for each work piece. Preferably, nitrogen gas, which is relatively inexpensive, yet can be obtained with high purity and without any moisture content, is used. The use of nitrogen gas both increases the repeatability of the test and does not contribute to corrosion of the tested work pieces.

One side of a modified Western Gage Corporation (Newbury, California) Model AEC 10 gauge is connected to the pressurized nitrogen source, and the other side of the gauge is preferably connected through the fixture containing the work piece to the work piece's orifice to measure the pressure drop of the gas flowing through the orifice in the same manner as the fluid would exit from the work piece's orifice in its intended use. The pressure drop is read by the gauge, and the flow rate previously noted is graphed as a function of the gauge reading for each work piece.

Figure 4:
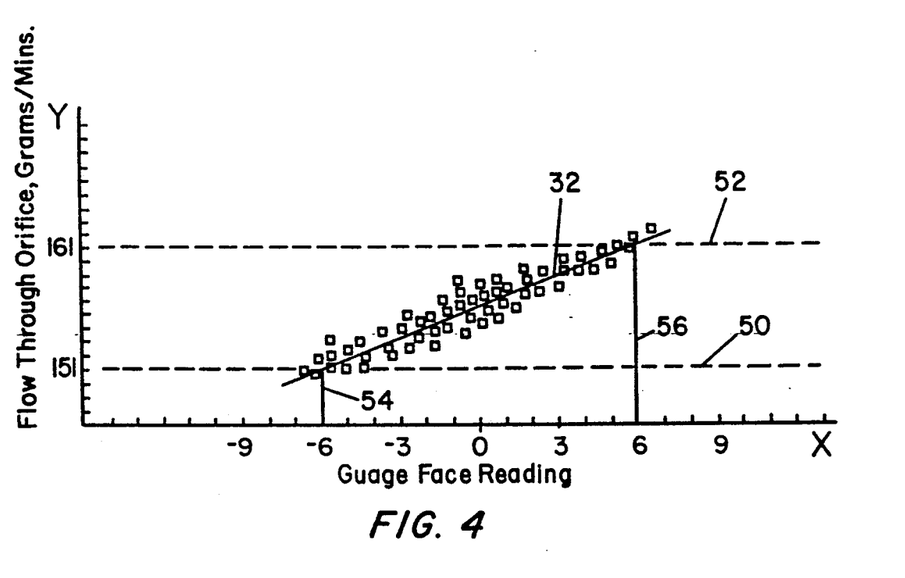
FIG. 4 illustrates a graph of the type which can be used to practice the present invention.

The nitrogen pressure value and the orifice flow value uniquely associated with each work piece, define a data point for that work piece. This data can be used as the coordinates of a graph. As shown in FIG. 4 for example, a calibration curve is obtained by plotting a regression line 32 through the data derived from the work pieces. In the graph shown in FIG. 4, the y axis is defined as the specified flow values, and the x axis is defined as the corresponding nitrogen pressure drop values. The high and low limits of acceptable flow for a completed orifice in a work piece are known. As shown in FIG. 4 for example, these limits can be drawn horizontally (dashed lines 50, 52) from the vertical axis to the regression line. Dropping vertical lines (54, 56) down from the intersecting points of the regression line defines the nitrogen pressure drop values required to meet the flow specification of the particular work piece. Furthermore, a confidence range can be defined about the regression line to increase confidence in the calibration curve.

The gauge can then be calibrated to enable the EDM operator to identify when the EDM is producing acceptable orifices. The gauge reading limits that separate acceptable flow orifices in the work pieces from orifices that are too big or too small, are set on the face of the gauge. One limit point on the gauge face corresponds to the lowest flow rate for acceptable fluid flow, and the other limit point on the gauge face corresponds to the highest flow rate for acceptable fluid flow. The ideal span on the gauge face is approximately 180°. Parameters such as the pressure of the nitrogen source, and other parameters which can be adjusted on the pressure gauge, are set so that there is about a 180° span between the low limit on the gauge face and the high limit on the gauge face. If the high and low limits are too close together, the narrow span becomes difficult for the operator to use because it becomes hard to discriminate between work pieces within the specification and work pieces outside the specification. If the high and low points are at the limit of travel of the gauge needle, the operator cannot observe how far past the limit that the orifice in the work piece exceeds the acceptable range.

Preferably, about thirty work pieces of a particular specification are used to generate the calibration curve for the nitrogen pressure gauge. One of the work pieces representing a low flow limit is selected for use as a master in setting the low limit on the gauge face and the pressure of the gauge. Another work piece representing a high flow limit is selected for use as the master for setting the span at the high limit on the gauge face. A third work piece representing the nominal flow rate also can be selected as the master to be used to set an intermediate point of the calibration curve at an intermediate point between the two limit points on the gauge face. Each of the master work pieces preferably falls on or very close to the regression line of the calibration curve. The breadth of the gauge span from the low limit to the high limit point is set by manipulating an adjustment screw. The three master work pieces can be used each time one desires to produce a similar work piece according to the particular specification for which they were produced. Preferably, each master is coated with titanium to preserve its useful life as a master.

Each work piece to be tested is mounted to the fixture so that the flow orifice communicates with the pressurized source of nitrogen through the pressure gauge. To accomplish this, the fixture preferably has a flexible "O" ring which seats around the orifice of the work piece to isolate the flow orifice as the only flow path for the pressurized nitrogen. Once the work piece is mounted on the fixture, the pressurized nitrogen source is connected to discharge through the fixture and through the flow orifice of the work piece, and a pressure drop reading is taken on the pressure gauge.

Because of the speed of operation of the gauge, every orifice can be tested without unduly and uneconomically delaying the processing steps which occur after fabrication of the orifices. Once the gauge has been calibrated to identify work pieces with acceptable flow orifices, each work piece can be tested immediately after the EDM has fabricated the flow orifice. However, the orifices can be inspected at any stage of the production process following fabrication of the orifice. The foregoing defines 100% testing mode embodiments of the present invention. As shown in FIG. 5 for example, this corresponds to a predetermined schedule of selection that calls for testing every work piece.

The method of the present invention further includes the step of comparing the measured pressure drop of the flow orifice to the correlation of pressure drop and flow through the orifice of the particular desired flow specification. Thus, the gauge reading of the pressure drop of the orifice being tested is used to locate this particular work piece on the correlation of pressure drop and flow for this particular specification. If this gauge reading is within the limits of acceptable gauge face readings, which were set during the calibration, then the work piece is acceptable and can be installed as part of a finished product. Those work piece flow orifices which give gauge readings outside of the acceptable range, either too high or too low, are rejected as inadequate and never fabricated into a finished product. This is a 100% testing embodiment illustrated in FIG. 5 for example, when the predetermined schedule of selection calls for testing 100% of the parts. This embodiment can be used to sort through parts which have been manufactured and determine which parts have orifices within the desired flow specification. Furthermore, various other quality control sampling plans can also be used in place of 100% inspection to determine the approximate distribution of parts within the specification.

The method of the present invention further preferably includes the step of using the results of the comparison of the pressure drop of the work piece to the correlation of pressure drop and flow for the particular specification involved, to help determine whether an adjustment is needed to the apparatus which produces the very small orifice or to one of the preliminary processing steps. Examples of preliminary processing steps include heat treatment, polishing lapping, coating, turning, stamping, etc. As embodied herein, the result of the nitrogen pressure test can be used to generate a frequency distribution of gauge readings. This enables the operator of the apparatus producing the orifices to know whether most of the parts being produced fall close to the middle of the specification for the orifice. As long as the result of the comparison of the nitrogen pressure test indicates that the tested orifice falls within a desirable frequency distribution, the operator can refrain from making any adjustment in the apparatus or any other processing steps. However, when the comparisons indicate that the tested orifices fall outside of the desired distribution, and in fact are forming a new frequency distribution, the operator can make an adjustment so as to move the comparison results of the subsequent work pieces toward the center of the desired frequency distribution of work pieces. Alternatively, the operator can make the adjustments so as to move the results of the comparison of the subsequent work pieces toward the center of the new frequency distribution.

The results of the comparison can be used to help determine whether an adjustment is needed to the hole fabrication apparatus or possibly one of the preliminary processing steps. For example, when the results of the comparison indicate a sudden or large deviation in the pressure drop readings that previously were being recorded, it may indicate that the cause of the deviation is one of the preliminary processing steps. This is especially true when the deviation is too large to be corrected by adjusting the hole fabrication device. When one of these two conditions exists, it indicates that an investigation of the preliminary processing steps is warranted. Depending on the outcome of such an investigation, an adjustment may be made to one or more of the preliminary processing steps.

In still further accordance with the present invention, a statistical process control plan can be used to track the manufacturing method and monitor when the adjustments need to be made to the orifice producing apparatus or other processing steps. As shown in FIG. 5 for example, this corresponds to using a statistical process control plan for the predetermined schedule of selection. Two examples of suitable statistical process control plans are the Shainin Precontrol Method and the Shewhart $\overline{X}$,R Chart Method. The use of such statistical process control plans preferably envisions that the 100% testing embodiment of the present invention results in a frequency distribution that is narrowly defined around the center of the range of acceptable flow according to the desired orifice specification.

The method of the present invention lends itself to automation. For example, after the orifice fabrication device produces the orifice in the work piece, a mechanical pusher moves the work piece onto an inclined slide, and the work piece is gravity fed to a staging platform. A robot, or simply a gravity feed or conveyor system, moves a work piece onto the pressure test jig, and a sensing device indicates the presence of the work piece in position on the jig. A clamp is activated to hold the work piece in position on the jig during the application of the nitrogen pressure. Upon completion of the nitrogen pressure drop test, the clamp releases the work piece and a mechanical pusher moves the work piece from the jig into a receiving bin. The result of the pressure test can be used to cause the pusher to discriminate between more than one receiving bin so that acceptable and unacceptable orifices can be separated.

The result (good or bad) of the nitrogen pressure test also can be used to provide feedback for operating the electro discharge machine (EDM). This also applies to another apparatus which produces the flow orifice in the work piece or to one of the preliminary processing steps. If a group of orifices has been produced within a defined flow range, which can be defined for example by a statistical process control plan such as the Shainin Precontrol Method or the Shewhart $\overline{X}$,R Chart Method, then the EDM continues to make flow orifices under the same operating parameters as before. However, if the inspection indicates that the group of flow orifices is outside this flow range, the EDM is adjusted accordingly to change the flow characteristics of the flow orifices. This is the feedback portion of the method. This feedback can be automated by having the gauge produce a signal provided to the EDM directly or through a microprocessor which has been preprogrammed to perform a desired feedback control methodology.

In further accordance with the present invention, at least one operating parameter of the apparatus used to produce the very small hole can be adjusted to correct any discrepancy between the measured orifice and the preselected flow specification. As embodied herein, when the apparatus is an EDM, the operating parameter preferably adjusted is the peak current intensity for the EDM's electrode. The peak intensity is increased to produce a larger orifice and decreased to produce a smaller orifice. Other EDM operating parameters which can be adjusted include the on and off times for the electrode, the servo settings of the EDM, the power settings of the EDM, the feed rate of the spark erosion electrode, or replacing the electrode, either with another one of the same nominal size or a different nominal size. Examples of the processing steps which may require adjustment include turning processes, stamping processes, polishing processes, lapping processes, coating processes, and heat treatment processes. These processing steps occur prior to the nitrogen pressure drop test, but can occur either before or after the hole is fabricated, whichever order best suits the particular type of work piece being produced.

Each specification for producing a particular orifice requires the production of a new correlation curve for calibrating the gauge. This results in the production of a master set of work pieces for each different orifice specification. Each master set can be used again and again each time this particular orifice specification must be produced by the EDM.

A specific example of one application of the present invention involves the production of a flow orifice in the orifice plate of a fuel injector. The specification for the fuel injector involved in this specific example requires a flow rate of between 151 grams per minute and 161 grams per minute of Stoddard solvent through an assembled injector.

As shown in FIG. 5 for example, once a group of about 30 orifice plates are produced which are deemed acceptable by the Stoddard test of a mock assembly, these 30 orifice plates are built into actual injectors. A Stoddard test is repeated with the assembled injectors to obtain more representative flow values, which are noted for each injector. The orifice plates are then cut out of the assembled injectors. The cut out orifice plates are tested using the nitrogen pressure drop test, and the nitrogen pressure drop is read by the gauge for each orifice plate and noted. A calibration curve is drawn in which the "y" axis is the flow rate as noted from the Stoddard test of the assembled injector. The "x" axis is the pressure drop from the nitrogen test. The high and low limits of acceptable flow for completed injectors are established by the particular specification for this particular fuel injector. A calibration curve is obtained by plotting a regression line through the data derived from the orifice plates and the fully assembled injectors tested with the same orifice plates. As shown in FIG. 4 for example, horizontal lines 50, 52 are drawn from each of the limits on the vertical axis to the regression line 32. Vertical lines 54, 56 are dropped from the intersection points of the horizontal lines with the regression line. The vertical lines define the pressure drop readings that are required to meet the flow specification. Furthermore, a confidence range can be defined about the regression line to increase the confidence in the calibration curve. For example, a pair of lines (not shown) can be drawn parallel to and about regression line 32 so as to encompass 95% of the data points. Then vertical line 54 is drawn from the intersection of the lower parallel confidence line with horizontal line 50, and vertical line 56 is drawn from the intersection of the higher parallel confidence line with horizontal line 52. This results in a narrower set of nitrogen pressure drop gauge readings for the two limits of acceptable gauge readings.

Figure 3:
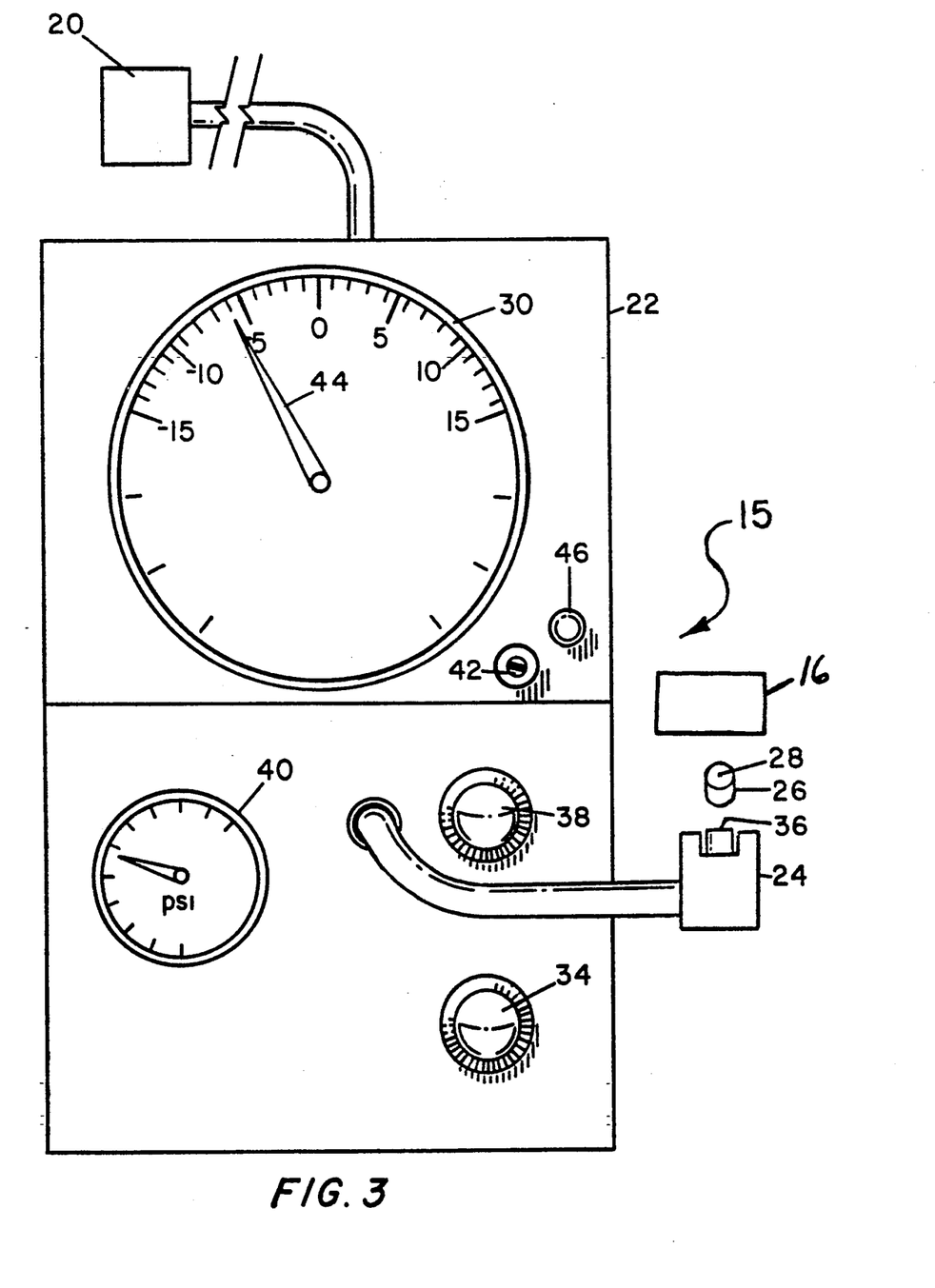
FIG. 3 illustrates an embodiment of components for practicing the present invention.

As shown in FIG. 3 for example, a source of nitrogen 20 is applied to one side of a pressure gauge 22, and a jig 24 is connected to the nitrogen source through the other side of gauge 22. Jig 24 is configured to receive an orifice plate 26, which has an orifice 28 extending therethrough. Each orifice plate is placed in jig 24 to be connected to the nitrogen source through gauge 22. The pressure drop is read on the face 30 of gauge 22. The flow rate and pressure drop of each orifice plate is plotted on a graph such as shown in FIG. 4 for example. Each square represents the flow rate and pressure drop data from one orifice plate. When this data for all of the orifice plates are plotted on the graph, a regression line 32 is calculated and drawn for this particular orifice plate specification.

The pressure gauge must be calibrated for the testing and monitoring function. As shown in FIG. 3 for example, the Western gauge is prepared for the calibration by setting the air pressure adjustment control knob 34 completely open. One of the orifice plates which has a flow rate close to the minimum acceptable flow rate, a gauge reading as close as possible to the minimum acceptable pressure drop, and a data point as close as possible to regression line 32 is selected to be used as a master for setting the low limit during calibration of the gauge. As shown in FIG. 3 for example, a low limit master 36 is inserted into jig 24, and pressure adjustment knob 38 is rotated until pressure gauge 40 indicates a pressure of about 13 psi. Then the zero adjustment screw 46 is rotated until the gauge face indicator 44 reads about minus six on gauge face 30.

Calibration of gauge 22 continues by selecting a high limit master from among the tested orifice plates. The high limit master should be near the high limit of acceptable flow rate and pressure drop, and on or very close to regression line 32. The high limit master plate is placed into jig 24, and span adjustment screw 42 is rotated until gauge indicator 44 points to a plus six reading on gauge face 30. Finally, an intermediate master orifice plate is selected near the middle of the range of flow rate and pressure drop, and on or very close to regression line 32, and zero adjust knob 46 is rotated until gauge indicator 44 reads at the zero point of gauge face 30. This completes the calibration of the gauge for this particular orifice plate specification.

Gauge 22 now can be used to test 100% of the manufactured orifice plates to determine whether each orifice plate falls within the desired specification. In this particular example, if gauge indicator 44 reads between minus six and plus six on gauge face 32 when the orifice plate is set into jig 24, then the orifice plate is acceptable. Readings less than minus six and greater than plus six indicate that the orifice plate is unacceptable and outside of the required flow rate specification. The testing of each orifice plate by gauge 22 calibrated in the manner described above constitutes a 100% testing embodiment of the present invention.

Using a 100% testing embodiment of the nitrogen pressure test, one can generate a frequency distribution curve of all parts tested (i.e., good and bad) such as represented by the solid line in FIG. 1 for example. Having possession of this information enables the EDM operator to avoid overcompensating when an occasional work piece falls within the distribution but near one of the limits of acceptable flow, as indicated by the nitrogen pressure drop test.

In an alternative preferred embodiment of the method of the present invention, actual nitrogen pressure testing of work pieces can be severely reduced by using a statistical process control plan such as the Shainin Precontrol Method or Shewhart $\bar{X}$,R Charts as known in the art, to track the manufacturing process and monitor when adjustments need to be made. In this way, only a small number of work pieces actually is subjected to the nitrogen pressure test over a given interval of time. This time interval can be on the order of one half hour for example.

The $\bar{X}$,R control charts developed by Walter Shewhart are discussed in Chapters 7 and 8 of *Guide to Quality Control* (Dr. Kaoru Ishikawa, Unipub Kraus International Publications, White Plains, New York, 1982, ISBN 92-8331036-S). The $\bar{X}$ R charts of Shewhart employ an average value ($\bar{X}$) of measurements made of a particular characteristic of the output of a process, a range of these measurement values (R), a central line, an upper limit line, and a lower limit line, to form a control chart. The $\overline{X}$ portion of the chart mainly shows changes in the means value of the specified output parameter of the process, while the R portion shows changes in the dispersion of the specified output parameter of the process. Once the $\overline{X}$,R Control chart is prepared, the process is controlled by making adjustments to the process depending upon trends, runs, shifts, etc. in the data. Subgroups of the measurements of the chosen characteristic of the process output are used to generate data from which an $\overline{X}$,R Control Chart can be prepared. The number of samples measured in a subgroup is the size of a subgroup and is represented by "n". The subgroup is a constant size. For example, five consecutive measurements taken periodically can form a subgroup. The number of subgroups is represented by "k". More than 100 sample measurements should be used to generate the $\overline{X}$ R control chart. Thus, if n=5, then k should equal about 25. The means value $\overline{X}$, is the average of the measured values in the subgroup. THus, if the subgroup size is 5, the sum of all of the 5 individual values is divided by 5 to yield $\overline{X}$. The range, R, is the arithmetic difference between the largest value in the subgroup and the smallest value in the subgroup. The overall means value, $\overline{\overline{X}}$, is the sum of the means values ($\overline{X}$) for each subgroup divided by the number of subgroups, which is k. The range's average value $\overline{R}$, is the sum of the ranges for all subgroups divided by the number of subgroups, k. To compute the control limit lines for the $\overline{X}$,R Control Chart, the following formulas are used. The coefficients ($A_2$, $D_4$, $D_3$) for calculating the control lines are shown in the following table.

| n | $A_2$ | $D_4$ | $D_3$ |
|---|-------|-------|-------|
| 2 | 1.880 | 3.267 | 0.0 |
| 3 | 1.023 | 2.575 | 0.0 |
| 4 | 0.729 | 2.282 | 0.0 |
| 5 | 0.577 | 2.115 | 0.0 |
| 6 | 0.483 | 2.004 | 0.0 |
| 7 | 0.419 | 1.924 | 0.076 |

For the $\overline{X}$ portion of the Control Chart, the central line equals $\overline{\overline{X}}$; the upper control limit equals $\overline{\overline{X}} + A_2\overline{R}$; and the lower control limit equals $\overline{\overline{X}} - A_2\overline{R}$. For the R portion of the Control Chart, the central line equals $\overline{R}$; the upper control limit equals $D_4\overline{R}$; and the lower control limit equals $D_3\overline{R}$. The Control Chart is constructed so that the upper and lower control limits are separated by about 20 to 30 millimeters, the control lines are drawn and labeled, and the central line is drawn. The $\overline{X}$ and R values are plotted on the Control Chart, and the points which lie beyond the control limit lines are circled to distinguish them from the other points. The plotted points should be about 2 to 5 millimeters apart. The total data for one day's production is plotted as a histogram and shows the distribution of all of the data from which the subgroup was taken. The data taken in the subgroup will give a certain appearance depending upon whether the process is in a controlled state. If the process is in a control state, then the process will be stable and there will be no abnormality in the points on the Control Chart. The Control Charts enable the operator to know when the distribution of parts made during a day is shifting from the center line of the chart or whether the range of means values of the parts made during a day is getting larger, even though the distribution still is centered about the center line. A shift in the means for the production process is detected by a change in the $\overline{X}$ control chart. A change in the dispersion of the characteristic value of the production process is detected by an abnormality on the R control chart and an abnormality on the $\overline{X}$ control chart. When a production process is in a controlled state, all of the points lie within the control limits, and the point groupings do not assume a particular form. Thus, if some points are outside the control limits or if the points assume a particular form even though they are within the control limits, then a change has evolved in the production process and an abnormality may exist. When several points line up consecutively on one side only of the central line, this is called a "run." A run of seven or more points indicates an abnormality in the process. A continued rise or fall in a series of points is called a "trend." If seven consecutive points continue to rise or fall, this indicates an abnormality. "Periodicity" is a repeating pattern of change over equal intervals. When the points on the control charts stick close to the central line or to the control limit, this is called "hugging of the control line." Statistical control charts are discussed in Sections 14-4 and 14-5 of *Quality Planning and Analysis* (J. M. Juran and Frank M. Gryna, Jr., 2nd Edition, McGraw-Hill, Inc., 1980, ISBN 0-07-033178-1). Precontrol charts are discussed in Section 14-6 of *Quality Planning and Analysis*—2nd Edition and on pages 8-134 to 8-136 of *Industrial Engineering Handbook* (H. B. Maynard, McGraw-Hill, Inc., 3rd Edition, 1971). Shainin PRE-Control is a statistical technique for detecting process conditions and changes which may cause defects in the output of the process. PRE-Control starts a process centered between specification limits and detects shifts that might result in making some of the parts outside a print limit. PRE-Control requires no plotting and no computations and needs only two workpieces to give control information. The technique utilizes the process distribution curve in the determination of significant changes in the aim or the spread of a production process that could result in the increased production of defective work. The technique of PRE-Control is summarized by applying the following set of rules to a production process that is centered between specification limits. (1) The specification tolerance band is divided with PC lines at one-quarter and three-quarter of the tolerance. (2) The job is started. (3) If a piece is outside the specification limits, reset the process. (4) If one piece is inside the specification limits but outside a PC line, check the next piece. (5) If the second piece is also outside the same PC line, reset the process. (6) If the second piece is inside the PC line, then continue the process and reset only when two pieces in a row are outside a given PC line. (7) If two successive pieces show one to be outside the high PC line and one below the low PC line, action must be taken immediately to reduce variation. (8) When five successive pieces fall between the PC lines, frequency gauging, may start. While waiting for five, if one piece goes over a PC line, restart the count to five. (9) When frequency gauging, let the process alone until a piece exceeds a PC line. Check the very next piece and proceed as in step 6 above. (10) When the production machine is reset, five successive pieces inside the PC lines must again be made before returning to frequency gauging. (11) If the operator checks more than 25 times without having to reset, the gauging frequency may be reduced so that more pieces are made between checks. If, on the other hand, the operator must reset before 25 checks are made, increase the gauging frequency. An average of 25 checks to a reset is an indication that the gauging frequency is correct. These references are hereby incorporated herein in their entirety.

In order to implement this reduced number of tested work pieces and still obtain high yields, i.e., low rejects, the orifice manufacturing method must be operating with sufficient accuracy to define a narrow distribution around the center of the specification range of acceptable orifices. In other words, the 100% testing of work pieces must indicate that the majority of the work pieces being manufactured are falling close to the middle of the range of acceptable orifices. Once this is accomplished by proper operation and control over the numerous aspects of the manufacturing process, then one can reduce the frequency of testing.

The nitrogen pressure test of the present invention provides numerous advantages. It enables the operator of the EDM or other hole fabrication device to understand and control how to set up and adjust the operating parameters of the device. Thus, when processing variables affect the production of the orifice, the nitrogen pressure test enables corrections to be made so that the hole fabrication device can continue to produce acceptable flow orifices. Moreover, there is no need to set up a mock assembly before a test can be conducted. The nitrogen pressure test of the present invention can be performed in a matter of seconds, and so facilitates testing 100% of the orifices in the work pieces. Unlike prior methods, the time needed to perform the nitrogen pressure test of the present invention is less than the time needed to produce the orifice. Thus, performing the nitrogen pressure test does not cause undue delay in production and provides more rapid feedback for production of subsequent orifices than is possible with prior methods. The nitrogen pressure test of the present invention reduces the time needed to set up the operation of the hole fabrication device to produce acceptable orifices and eliminates over adjusting the operating parameters of the hole fabrication device when adjustments must be made to compensate for changing conditions in the device and/or other steps in the manufacturing process. Furthermore, by using statistical process control, only a small number of samples need be tested.

It will be apparent to those skilled in the art that various modifications and variations can be made in the present invention without departing from the scope or spirit of the invention. Thus, it is intended that the present invention cover the modifications and variations of this invention provided they come within the scope of the appended claims and their equivalents.

What is claimed is:

1. A manufacturing method for producing at least one very small orifice in each of a succession of work pieces according to a desired specification, the method comprising the steps of:
   (a) using an apparatus to produce a very small orifice in each work piece taken from the succession of work pieces;
   (b) selecting a first work piece from the succession of work pieces according to a schedule of selection determined by a statistical process control plan which calls for less than 100% selection;
   (c) flowing a gas through said orifice of said first work piece;
   (d) measuring a pressure drop related to said gas flowing through said orifice of said first work piece;
   (e) comparing said pressure drop to a correlation of said relation pressure drop and flow through orifices of the desired specification derived from the performances of at least two work pieces; and using the results of said comparison to help determine whether an adjustment is needed to said apparatus.

2. A method as in claim 1, further comprising:
making said adjustment in said apparatus to produce a very small orifice in at least one work piece following said first work piece in said succession of work pieces.

3. A method as in claim 1, further comprising:
   (a) prior to producing a very small orifice in said each work piece, subjecting a plurality of said work pieces in the succession to at least one preliminary processing step; and
   (b) wherein the results of said comparison are used to help determine whether an adjustment is needed to at least one of said preliminary processing steps.

4. A method as in claim 1, wherein:
said step of using the results of said comparison to determine whether an adjustment is needed, comprises the steps of:
   (i) using the result as data in generating a first frequency distribution; and
   (ii) refraining from making an adjustment when said comparison result falls within said first distribution.

5. A method as in claim 4, further comprising:
   (iii) making an adjustment when said comparison result indicates said first distribution has changed to a second distribution; and
   (iv) making said adjustment so as to move said comparison result of the next work piece in said succession of work pieces toward the center of said first distribution.

6. A method as in claim 4, further comprising:
   (iii) making an adjustment when said comparison result indicates said first distribution has changed to a second distribution; and
   (iv) making said adjustment so as to move said comparison result of the next work piece in said succession of work pieces toward the center of said second distribution.

7. A method as in claim 1, further comprising:
using said statistical process control plan to track said manufacturing method and monitor when said adjustments need to be made.

8. A method as in claim 7, wherein:
said statistical process control plan is one of the group comprising the Shainin Precontrol Method and the Shewhart $\overline{X}, R$ Chart method.

9. A method as in claim 2, wherein:
said step of making an adjustment is performed by an electronic control unit which can include at least one microprocessor unit which receives at least one of the types of information including operating parameters of said apparatus, pressure readings, said operator supplied inputs, and controls the said apparatus according to at least one of said types of information.

10. A method as in claim 1, wherein said predetermined schedule of selection includes one chosen from the group including:

the Shewhart $\overline{X}$ R Chart method as the Shainin Precontrol Method.

11. A method as in claim 1, wherein:
said gas is nitrogen.

12. A method as in claim 1, wherein:
said apparatus for producing a very small orifice comprises an electro discharge machine.

13. A method as in claim 1, wherein:
said apparatus for producing a very small orifice comprises a drilling machine.

14. A method as in claim 1, wherein:
said step of measuring the pressure related to said orifice is performed using a pressure gauge.

15. A method as in claim 1, wherein:
the step of measuring pressure is automated.

16. A method as in claim 1, wherein:
said step of using said results of said comparison is performed by an electronic microprocessor which receives electric signals indicative of the pressure obtained during said step of measuring said pressure.

17. A method for manufacturing a small orifice in each of a succession of production work pieces destined for assembly into a desired product, wherein the desired product performs according to a preselected flow specification, the method comprising the steps of:
   (a) establishing a correlation between the desired flow performance of the production work piece and a test gas pressure associated with the flow through the orifice of the production work piece by the steps including:
      (i) machining an orifice through each work piece in a group including about 30 sample work pieces,
      (ii) taking gas pressure data associated with the flow of the test gas through each of the machined orifices of the sample work pieces,
      (iii) assembling each of the sample work pieces into at least one desired product,
      (iv) test flowing each of the assembled products with the actual fluid or a close simulation of the actual fluid, and
      (v) correlating the results of the fluid tests of the assembled products with the sample workpieces with the results of the gas pressure tests of the unassembled sample workpieces to produce a correlation of test gas pressure values versus fluid flow values for the desired product;
   (b) machining an orifice through each production work piece;
   (c) connecting a test gas pressure source via a gas pressure gauge to discharge through said orifice of each said production work piece chosen according to a statistical process control plan;
   (d) measuring on said gauge the gas pressure measurement related to flow through each said orifice so chosen; and
   (e) using said correlation and said gauge pressure measurement to determine whether said chosen orifice satisfies the preselected flow specification.

18. A method as in claim 17, further comprising the steps of:
   (f) using said correlation and said gauge pressure measurement of said chosen orifices to determine whether the mean of a distribution of said production work pieces is deviating from the mean of the preselected flow specification; and
   (g) adjusting at least one operating parameter of said orifice machining device to correct any deviation between the mean of said production distribution and the mean of the preselected flow specification.

19. A method as in claim 17, wherein:
said machining is performed by an electro discharge machine.

20. A method as in claim 19, further comprising:
adjusting at least one operating parameter of said electro discharge machine to correct any discrepancy between the measured orifice and the preselected flow specification.

21. A method as in claim 17, further comprising the steps of:
   (f) using said correlation and said gauge pressure measurement of said chosen orifices to determine whether the range of a distribution of said production work pieces is exceeding the range of the preselected flow specification; and
   (g) adjusting at least one operating parameter of said orifice machine device to move said production distribution within the range of the preselected flow specification.

* * * * *